United States Patent
Smith et al.

(10) Patent No.: US 10,250,645 B1
(45) Date of Patent: Apr. 2, 2019

(54) INTELLIGENT CONTROLLED-ENVIRONMENT FACILITY RESIDENT COMMUNICATION AND MEDIA DEVICE INTERFACES WITH MULTITASKING

(71) Applicant: Securus Technologies, Inc., Dallas, TX (US)

(72) Inventors: Matthew R. Smith, McKinney, TX (US); Joseph Higgs, Ft. Worth, TX (US); Krishna Balantrapu, Irving, TX (US); Maneshi Tuli, Irving, TX (US)

(73) Assignee: Securus Technologies, Inc., Carrollton, TX (US)

( * ) Notice: Subject to any disclaimer, the term of this patent is extended or adjusted under 35 U.S.C. 154(b) by 327 days.

(21) Appl. No.: 14/755,991

(22) Filed: Jun. 30, 2015

(51) Int. Cl.
*H04L 29/06* (2006.01)
*H04M 1/725* (2006.01)
*G06F 21/45* (2013.01)
*G06F 3/0481* (2013.01)

(52) U.S. Cl.
CPC ........ *H04L 63/205* (2013.01); *G06F 3/04817* (2013.01); *G06F 21/45* (2013.01); *H04L 67/42* (2013.01); *H04M 1/72558* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 2001/0011995 | A1* | 8/2001 | Hinckley | A63F 13/06 345/156 |
| 2008/0057976 | A1* | 3/2008 | Rae | H04W 64/003 455/456.1 |
| 2013/0263227 | A1* | 10/2013 | Gongaware | H04L 63/08 726/4 |
| 2014/0287715 | A1* | 9/2014 | Hodge | H04W 4/24 455/406 |
| 2015/0215254 | A1* | 7/2015 | Bennett | H04L 51/12 709/206 |
| 2017/0149962 | A1* | 5/2017 | Hodge | H04M 3/2281 |

* cited by examiner

*Primary Examiner* — William J. Goodchild
(74) *Attorney, Agent, or Firm* — Fogarty LLP

(57) ABSTRACT

A controlled-environment facility resident interface runs on top of, or as part of, an operating system of a controlled-environment facility resident communication and/or media device. Application programs (apps) available for use by a resident of the controlled-environment facility operating the device are presented on the device, via the interface. The interface may provide functionality to enable switching between apps by the resident, such as selectable open application program indicator(s) displayed on a screen of the device, and/or the interface may assign a function to device hardware button(s) to provide a mechanism for switching between apps. The app switching functionality may also resolve conflicts between apps for device resources and apply such resolutions as a result of the resident switching between apps. Also, the resident may be logged into one or more resident-selected apps using stored app login information for resident-selected apps in the interface, in combination with identity verification.

23 Claims, 5 Drawing Sheets

INTELLIGENT CONTROLLED-ENVIRONMENT FACILITY RESIDENT COMMUNICATION AND MEDIA DEVICE INTERFACES WITH MULTITASKING

TECHNICAL FIELD

The present disclosure relates generally to communication and media use by residents of controlled-environment facilities, and more particularly to providing a controlled-environment facility resident an interface capable of multitasking on an intelligent controlled-environment communication and/or media device.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Traditional methods for dissemination of education or entertainment media in controlled-environment facilities have included print libraries, or the like. Typically, residents of controlled-environment facilities, particularly controlled-environment facilities such as correctional institutions, are not allowed access to streaming content. Similarly, unrestricted or untethered access to wireless data communication systems is not typically allowed, such as for security reasons. That is to say, typically, there are security concerns in a controlled environment facility that result in a need for tightly controlled media.

SUMMARY

The present invention is directed to systems and methods, which run a controlled-environment facility resident interface on top of or as a part of an operating system of a controlled-environment facility resident communication and/or media device. Application programs (apps) available for use by a resident of the controlled-environment facility operating the controlled-environment facility resident communication and/or media device are presented on the controlled-environment facility resident communication and/or media device, via the controlled-environment facility resident interface.

In accordance with various embodiments of the present systems and methods, the interface may provide functionality to enable switching between apps by the resident. Such functionality may present at least one selectable open application program indicator, such as a selectable tab, or an application program icon, displayed on a screen of the controlled-environment facility resident communication and/or media device to provide the means to enable switching between apps. Alternatively, or additionally, such functionality may assign a function to one or more hardware buttons of the controlled-environment facility resident communication and/or media device to provide a mechanism that enables switching between apps, such as when a plurality of apps are open on the controlled-environment facility resident communication and/or media device. Further, such app switching functionality, or the like, may also resolve conflicts between apps for controlled-environment facility resident communication and/or media device resources and may apply such resolutions for access to controlled-environment facility resident communication and/or media device resources as a result of the resident switching between apps.

In accordance with various embodiments, app login information associated with the resident for each app may be stored by the interface, on the device or elsewhere. The resident may be logged into one or more resident-selected apps using this stored app login information for the resident-selected app in such embodiments. In such embodiments, the interface may accept identification information from the resident, verify the identification information, and log the resident into the selected app, using the stored app login information, such as, in response to verification of the identification information.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
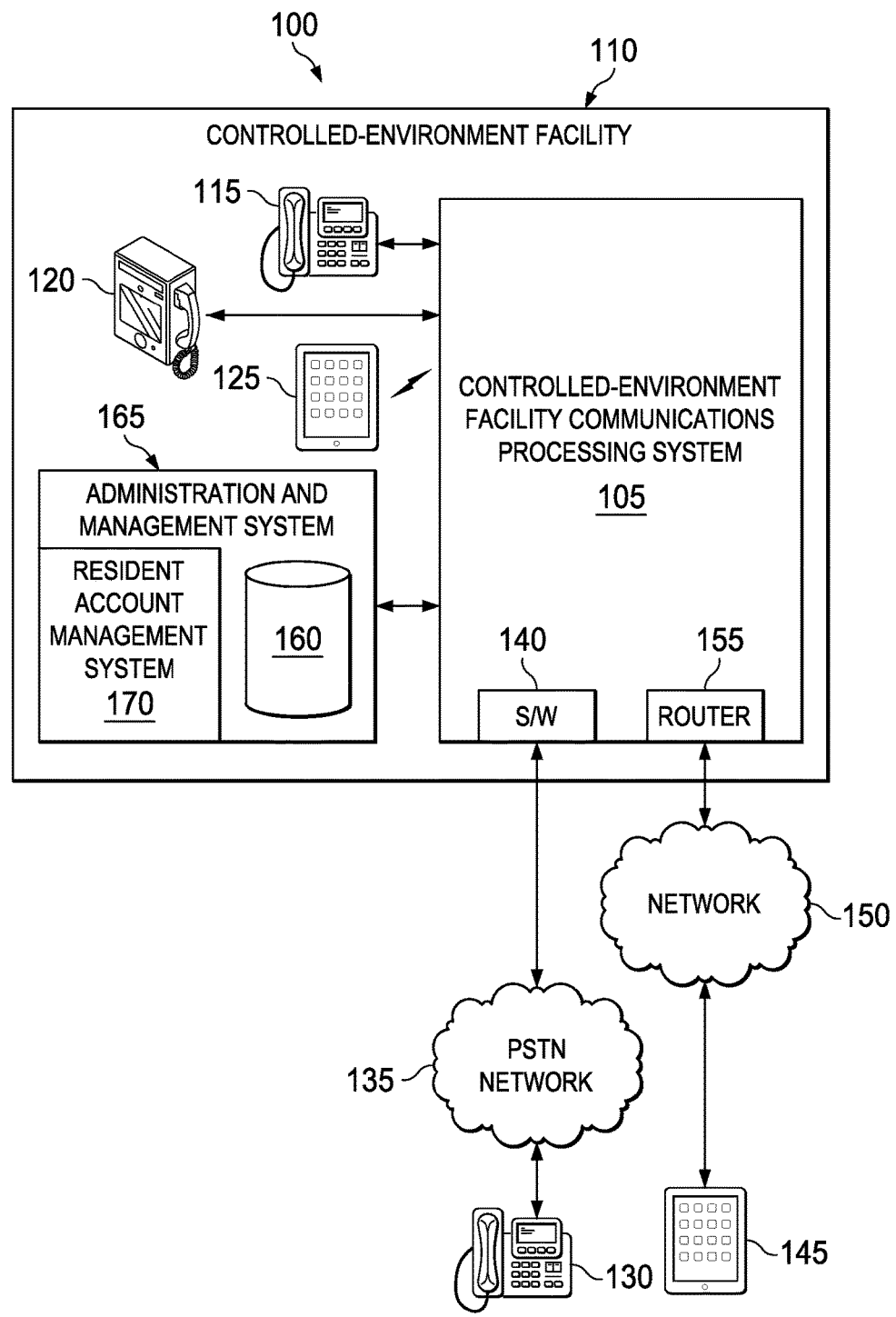
Figure 2:
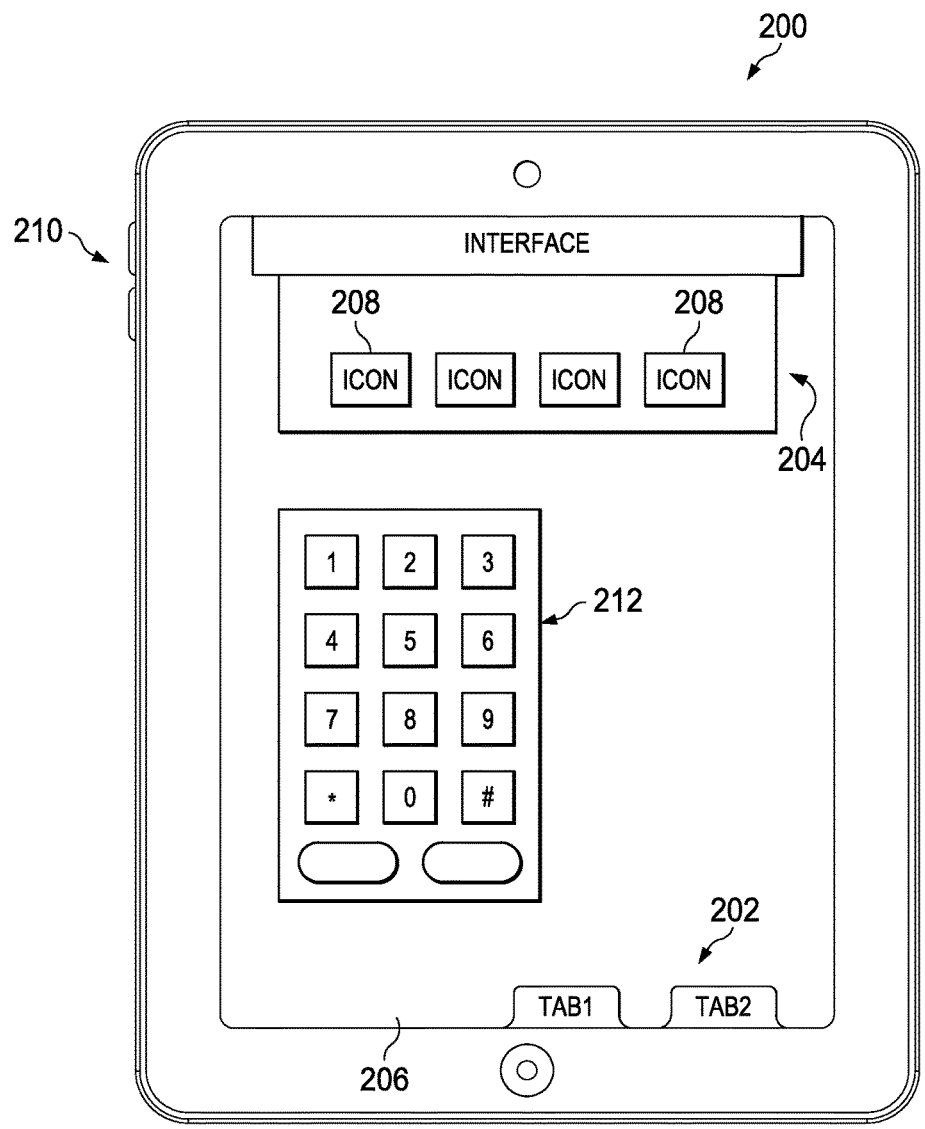
Figure 3:
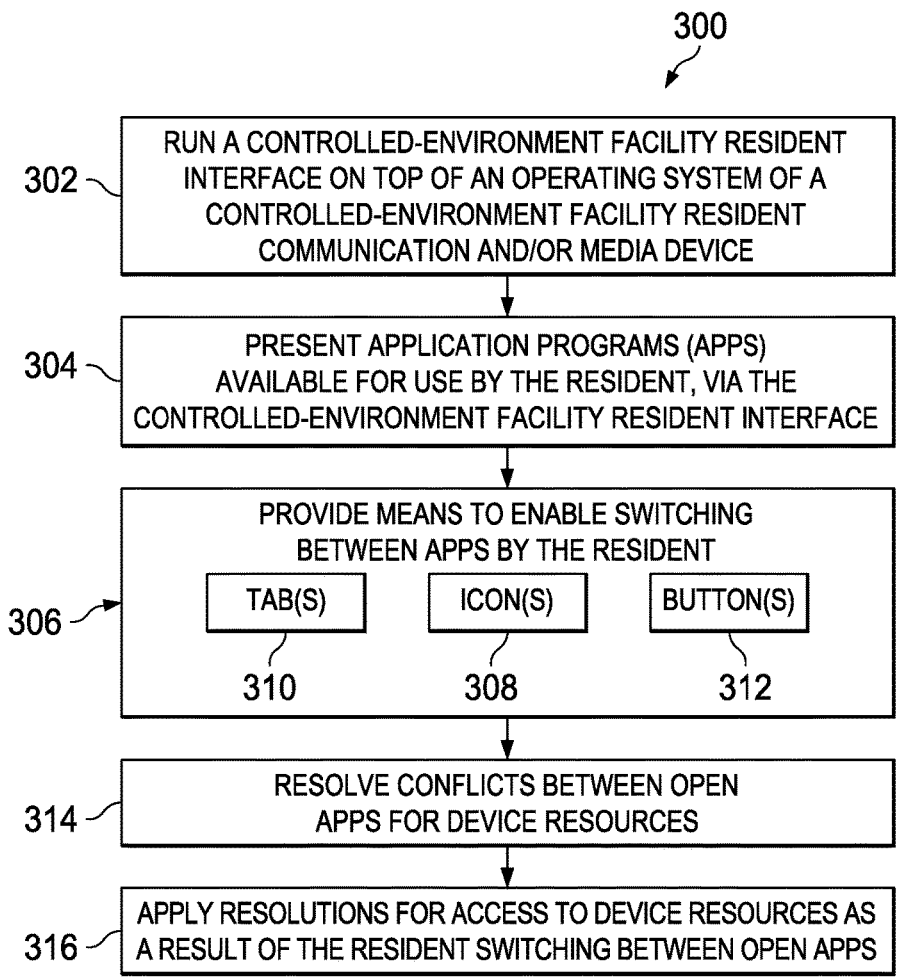
Figure 4:
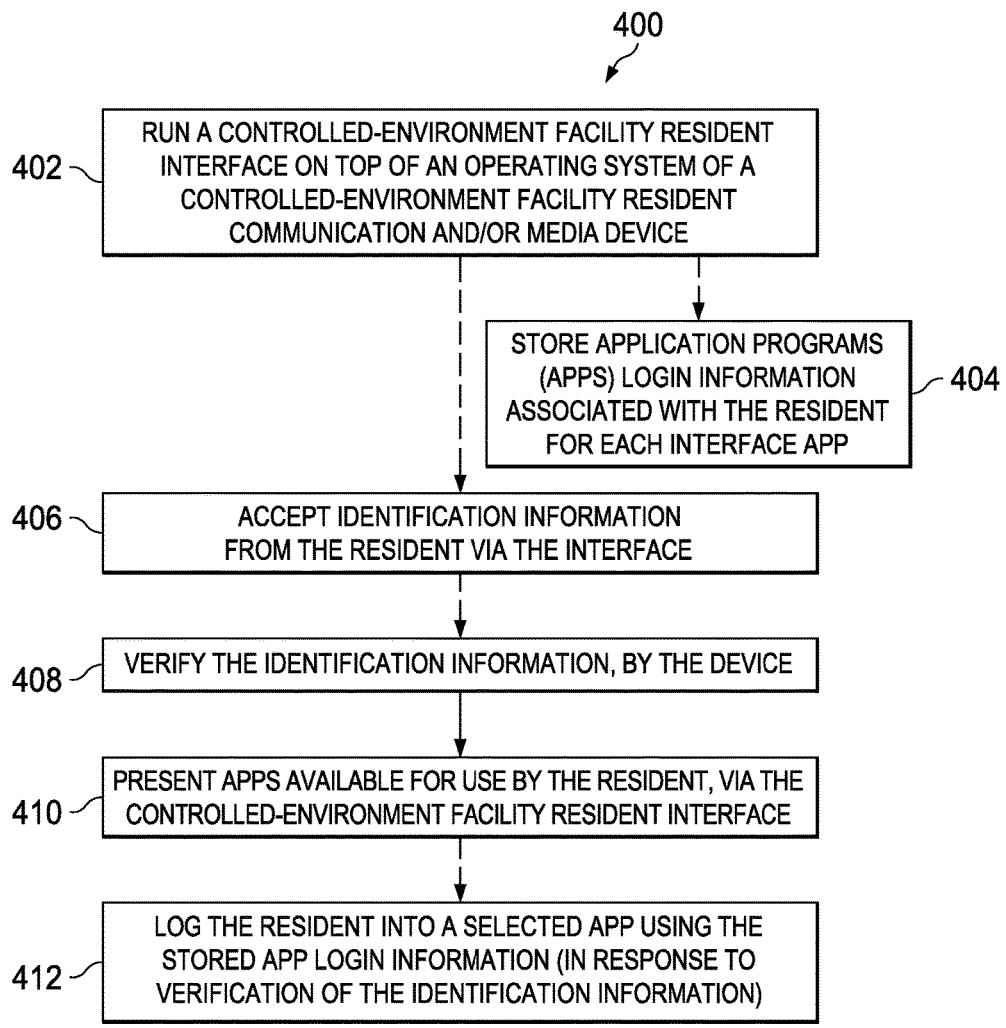
Figure 5:
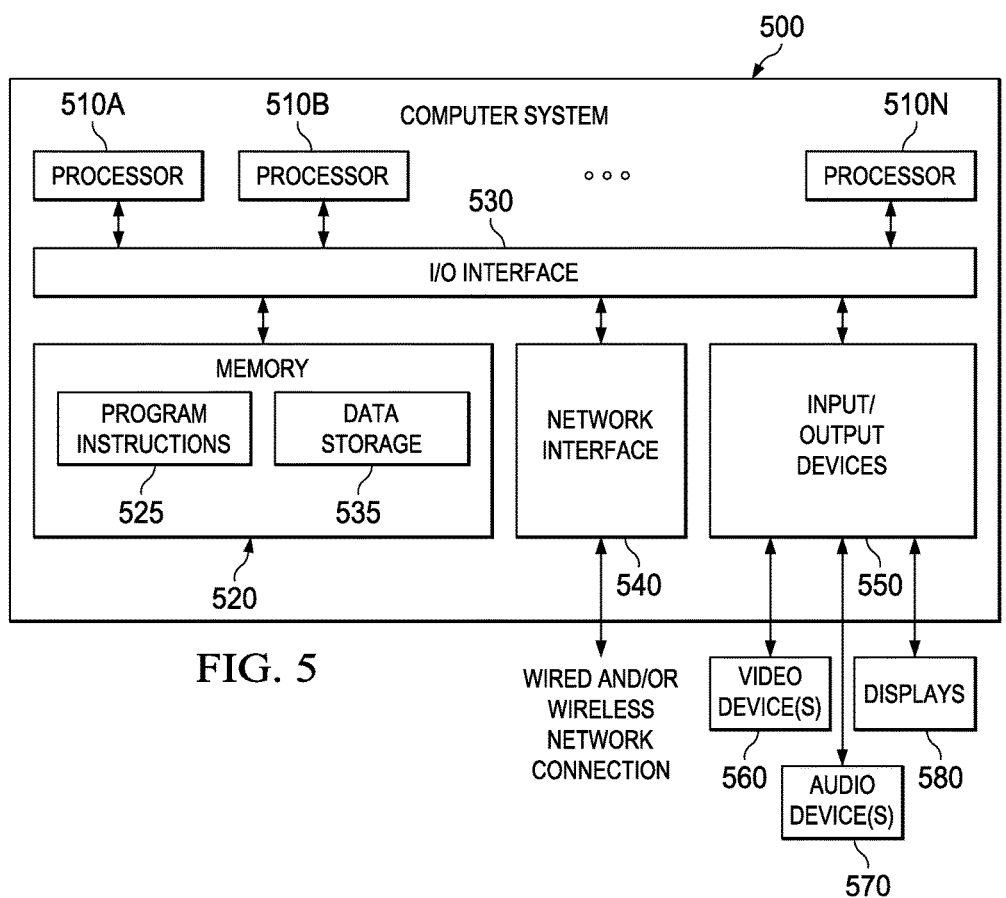

Having thus described the invention in general terms, reference will now be made to the accompanying drawings, which are not necessarily drawn to scale, and wherein:

FIG. 1 is a diagrammatic illustration of an example communications environment, wherein example embodiments of the present systems and methods for providing intelligent controlled-environment facility resident communication and/or media device interfaces may be employed, according to some embodiments of the present systems and methods;

FIG. 2 is a diagrammatic illustration of an example intelligent controlled-environment communication and/or media device, showing multitasking implementations, according to some embodiments of the present systems and methods;

FIG. 3 is a flowchart of an example process for providing multitasking on intelligent controlled-environment communication and/or media devices, in accordance with some embodiments of the present systems and methods;

FIG. 4 is a flowchart of an example process for providing automated application program login on intelligent controlled-environment communication and media devices, in accordance with some embodiments of the present systems and methods; and FIG. 5 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to communications and media use by residents of controlled-environment facilities, and more particularly to providing a controlled-environment facility resident an interface on an intelligent controlled-environment communication and/or media device, such as an Intelligent Facility Device (IFD) or Intelligent Resident Device (IRD), wherein the interface may facilitate multitasking. In accordance with embodiments of the present systems and methods, a controlled-environment facility resident interface runs on top of an operating system of a controlled-environment facility resident communication and/or media device or as a part of such an operating system. Application programs (apps) available for use by a resident of the controlled-environment facility operating the device are presented on the device, via the interface. The interface may provide functionality to enable switching between apps by the resident such as at least one selectable open application program indicator or application program icon displayed on a screen of the device, and/or the interface may assign a function to device hardware button(s) to provide a mechanism for switching between apps, or between an open app and an app that has yet to be opened. The selectable open application program indicator may, in accordance with various embodiments of the present systems and methods, take the form of a selectable tab. The app switching functionality may also resolve conflicts between apps for device resources and apply such resolutions as a result of the resident switching between apps. Also, the resident may be logged into one or more resident-selected apps using stored app login information for resident-selected apps in the interface, in combination with identity verification.

Previously, when using intelligent controlled-environment facility communication and media devices, such as an IFD or an IRD, a resident would only be able to perform one task at a time. This is typically due to system and hardware restraints typical for communications and media equipment adapted for use in a controlled-environment facility, especially in prisons, jails, or other correctional institutions. In accordance with embodiments of the present systems and methods, a resident may multitask. For example, in some such embodiments of the present systems and methods, residents can minimize an application and open one or more new applications if they wish. So a resident making a phone call and talking to the called party, may, for example, then use any other number of applications at the same time, such as to check their commissary balance, file a grievance, look up something in a resident handbook, and/or the like, all at the same time. This allows a resident to do more in less time, thereby preventing tie-up of communal resources such as IFDs. In accordance with such embodiments of the present systems and methods, using an IFD or IRD touchscreen, the resident can select an application to open, then minimize that application (not closing it) and open another application. Thus, numerous applications can be open at a time. Further, various embodiments may provide for automated login into applications presented on the user interface. Additionally, embodiments of the present systems and methods may determine which applications can be used simultaneously, such that applications using the same resources, such as audio, cannot be used at the same time or otherwise share such resources.

FIG. 1 is a diagrammatic illustration of example communications environment 100, wherein example embodiments of the present systems and methods may be employed, according to some embodiments. As shown, communication processing system 105 may provide telephone services, videoconferencing, online chat, and other communication services to residents of controlled-environment facility 110. In some cases, such as illustrated, communication system 105 may be co-located with controlled-environment facility 110. Alternatively, communication system 105 may be centrally or remotely located with respect to one or more controlled-environment facilities and/or may provide communication services to multiple controlled-environment facilities. More generally, however, it should be noted that communication system 105 may assume a variety of forms, and may be configured to serve a variety of facilities and/or users, whether within or outside of a controlled-environment facility.

Residents may use more-or-less conventional telephones 115 to access certain communication services. However, in accordance with embodiments of the present systems and methods, residents may also use a controlled-environment communication and/or media device or the like. For example, a resident may use a video communication device 120, or the like, to place voice calls, as well as for video communication. Such a video communication device may be referred to as an Intelligent Facility Device (IFD), which may be a video phone particularly adapted for use in a controlled-environment facility. Generally speaking, multiple video communication devices/IFDs 120 are disposed in controlled-environment facility, and may be disposed in a visitation room, in a pod, as part of a kiosk, etc. Additionally or alternatively, in accordance with embodiments of the present systems and methods, personal computer wireless devices, such as a tablet computing device or smartphone (125), which may have been adapted and/or approved for use in controlled-environment facility, may be used by controlled-environment facility residents for communication. Such a device may be referred to as an Intelligent Inmate Device (IID) in a correctional institution environment, and/or an Intelligent Resident Device (IRD), or the like, in controlled-environment facilities, in general. As will be appreciated, IFD 120, IRD 125, or other similar devices have video conferencing capabilities, or the like, to enable a party to participate in video communication sessions with other call parties, such as non-residents of the controlled-environment facility, via video communication, secure online chat, etc. Regardless, IFDs, IIDs, IRDs, etc. may be generally referred to herein as a controlled-environment communication and/or media device, or the like.

In various embodiments, video communication devices, IFDs 120, may be implemented as a computer-based system. For example, each of IFD 120 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, IFD 120 may be configured to capture a video image of a resident to be transmitted to a non-resident using the camera, and to display a video image of the non-resident to the resident using the display. IFD 120 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, IFD 120 may assume the form of any computer, tablet computer, smart phone, etc., or any other consumer device or appliance with videoconferencing capabilities. For example, in a correctional facility environment a tablet computing device may be mounted on a wall, in a hardened case, as a video communication device or IFD.

IRDs 125 may be tablet computing devices, smartphones, media players, or the like adapted and/or approved for use by residents of the controlled-environment facility (within the controlled-environment facility). Each IRD 125 may be particularly adapted for use in a controlled-environment. For example, in a correctional institution, jail, or the like, such an IRD, or IID, may have a specially adapted operating system and/or may be "stripped-down," particularly from the standpoint of what apps and/or hardware are provided or allowed on IRD 125, and/or connectivity afforded such an IRD. For example, such an IRD may employ an operating system kernel such one based upon an open source platform such as the CyanogenMod-based operating system, which may be built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon-to-be released inmates to transition. For example, the IRD may be used to communicate with a future employer, or the like. As such, IRDs may be sponsored, or otherwise subsidized by organizations or companies, assisting with the transition of inmates into society.

To access communication services, a resident may initiate telephone services by lifting the receiver on telephone 115 or IFD 120, and/or otherwise initiating a call, such as by launching a communications application program (app) on IFD 120 or on IRD 125. At which time, the resident may be prompted to provide a personal identification number (PIN), other identifying information or biometrics. An interactive voice response (IVR) unit (not shown, but which may be integrated into communication processing system 105) may generate and play a prompt, or other messages, to the resident on device 115, 120 or 125. Under the control of communication processing system 105, devices 115, 120 and 125 may be capable of connecting to a non-resident's (i.e., a person not incarcerated or otherwise committed to a controlled-environment facility) telephone 130 across a publicly switched telephone network (PSTN) 135. For example, telephone 135 may be located at a non-resident's home or office, at a resident visitation center, etc. Switch 140, in communication processing system 105, may be used to connect calls across PSTN 135. Additionally or alternatively, the non-resident may communicate using device 145, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 150. Router 155 of communication processing system 105 is used to route data packets associated with a call connection to device 145. For example, a non-resident party may have a device 145 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VoIP, such as SKYPE®. Additionally or alternatively, the correctional facility and/or the destination may use videoconferencing equipment compatible with ITU H.323, H.320, H.264, and/or V.80, or other suitable standards or non-standard specifications.

In addition to providing certain visitation and communication operations, communication processing system 105 may attempt to ensure that a resident's calls, video conferences, online chats, etc. are performed only with non-residents whose identities, devices, email addresses, phone numbers, etc. are listed in that resident's Pre-Approved Contact (PAC) list. Each resident's PAC list may be stored, for example, in database 160 maintained by controlled-environment Administration and Management System (AMS) 165. In addition to PAC list(s), AMS 165 may also store Resident Profile Data (RPD), as well as communication and/or visitation rules applicable to each resident. As an example, in the context of a correctional facility, AMS 165 may be referred to as a Jail Management System (JMS).

Within the AMS or JMS 165, database 160 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 170, which may be a separate system, or which may be a part or function of AMS 165, as illustrated, may maintain resident accounts to the benefit of the respective resident, such as a resident communications accounts, which may be used to pay for communications, such as phone calls, video visitation, internet chats, emails, text messages, or the like. Such communications accounts may in some embodiments, include community communications accounts maintained by controlled-environment facility resident account management system 170, administration and management system 165, and/or the like, of at least one controlled-environment facility, to the benefit of a number of residents of the same or different facilities for payment of communications.

In some implementations, communication processing system 105 may be configured to perform video communication monitoring operations configured to monitor and or record video communication sessions (e.g., as electronic video files). In scenarios where communication processing system 105 is located within the controlled-environment facility, it may have direct access to AMS or JMS 165. In other embodiments, however, communication processing system 105 may be located remotely with respect to the controlled-environment facility, and access to AMS or JMS 165 may be obtained via a computer network such as, for example, network 150.

Thus, in accordance with embodiments of the present systems and methods, a controlled-environment communication and/or media device, IFD 120 or IRD 125, may, as discussed in greater detail below, employ at least one processor and a memory coupled to the processor(s). This memory may be configured to store program instructions executable by the processor(s). These program instructions may include an operating system for controlled-environment communication and/or media device 120 or 125, and a controlled-environment facility resident interface program or application that includes program instructions executable by the processor(s). This controlled-environment facility resident interface may run on top of, and/or as part of, the operating system. The controlled-environment facility resident interface may present apps available for use by a controlled-environment facility resident on controlled-environment communication and/or media device 120 or 125 and provide the resident functionality for switching between running, active and/or inactive (i.e. open and/or unopened) apps on controlled-environment communication and/or media device 120 or 125. This interface may act as a resident communications platform, and also or alternatively, provide automated login for interface applications, provide a(n) (interactive) controlled-environment facility bulletin board, etc. To facilitate automated login or the like, the interface may store login information on device 120 or 125, and/or on a centralized support system, which may be located at the facility (e.g. as a part of controlled-environment facility communications processing system 105, or as a separate system) or in a remote location, or a combination of both.

FIG. 2 is a diagrammatic illustration of an example intelligent controlled-environment communication and/or media device 200, showing multitasking implementations, according to some embodiments of the present systems and methods. An IRD (125) is illustrated in FIG. 2 as intelligent controlled-environment communication and/or media device 200. However, similar multitasking functionality may be provided by an IFD (120), or the like. The aforementioned functionality for switching between apps might, at least in part, take the form of a selectable open application program indicator, such as illustrated tab(s) 202, displayed in, or in conjunction with, controlled-environment facility resident interface 204 on screen 206 of controlled-environment communication and/or media device 200, representing each open application program. These tabs, or other selectable open application program indicators, may display information such as a name of the app, the name of an open document, and/or may count up or down, such as during a call, or in conjunction with another application in which tracking time may be useful. In conjunction with such selectable open application program indicator(s) or the like, application program icons 208 may provide means for switching between an open application and another application that may or may not be open or running, such as through selection of such an icon (208) while the running application is open or minimized. Alternatively or additionally, the functionality for switching between apps may include a function assigned to one or more hardware buttons 210 of controlled-environment communication and/or media device 200, such as when a plurality of application programs are running and/or active on controlled-environment communication and/or media device 200. While a maximized app (e.g. illustrated calling app 212) may generally have access to any necessary resources, the controlled-environment facility resident interface program instructions may also be executable by the processor(s) to resolve conflicts between running apps for device resources, and/or to apply resolutions for access to device resources as a result of switching between running and/or active apps by the resident. Examples of such conflicts may include conflicts for: audio resources, such as speaker and/or microphone access; access to all or part of screen 206; access to computations resources such as, processor(s), memory or storage; visual resources such as cameras; and/or the like.

FIG. 3 is a flowchart of example process 300 for providing multitasking on intelligent controlled-environment communication and/or media devices (120, 125, 200, etc.), in accordance with some embodiments of the present systems and methods. Method 300 for providing multitasking on/in controlled-environment communication and/or media devices (120, 125, 200, etc.) may include running a controlled-environment facility resident interface on top of, and/or as part of, an operating system of the controlled-environment communication and/or media device (120, 125, 200, etc.) at 302. Therein, application programs (apps) available for use by a resident of the controlled-environment facility, who is operating the controlled-environment communication and/or media device, on the controlled-environment communication and/or media device, may be presented via the controlled-environment facility resident interface at 304, such as via icons (208). Thereby, providing the apps in a presentation layer on top of an operating system layer on the device. These apps maybe a part of the interface, integrated into the interface, or may run on top of the interface. Functionality may be provided, at 306, to enable switching between running and/or active apps by the resident user and/or the user may open and switch to another app, at 308, by selecting another app presented by the interface (as an icon). A mechanism to enable switching between apps at 304 may be presented as at least one selectable tab (202), other selectable open application program indicator, and/or application program icons, displayed in the controlled-environment facility resident interface (204) on a screen (206) of the controlled-environment communication and/or media device (120, 125, 200, etc.), at 310. Additionally or alternatively, at 312, the mechanism to enable switching between apps may take the form of a function assigned to one or more hardware buttons (210) of the controlled-environment communication and/or media device (200) such as when a plurality of application programs are running/active on the controlled-environment communication and/or media device. Regardless, the functionality to enable switching may, at least in part, resolve conflicts between running and/or active apps for device resources at 314, and at 316 apply resolutions for access to device resources as a result of the resident switching between running and/or active application programs (via the functionality provided at 306-312).

Thus, in accordance with such implementations, applied by way of example to IRD 200 of FIG. 2, a resident making a phone call on device 200 and talking to the called party, using open phone app 212, may then use any other number of applications represented by icons 208 in interface 204 at the same time, such as to check their commissary balance, file a grievance, look up something in a resident handbook, and/or the like, all at the same time. This allows a resident to do more in less time, thereby preventing tie-up of communal resources such as Wi-Fi bandwidth, IFDs (in corresponding IFD embodiments), or the like. In accordance with such embodiments, using an IFD or IRD touchscreen 206, the resident can select an application 208 to open, then minimize that application (not closing it) and open another application 208. Minimizing an application (and/or in some embodiments merely opening the application) will result in a tab (202), or the like, being displayed for that application. Thus, on illustrated IRD 200 of FIG. 2, phone app 212 is open and active, while two other applications, represented by tab1 and tab2 (202), are minimized, but running, available for opening. Clicking on a tab (202), other selectable open application program indicator or application program icon switches to the indicated application. Additionally or alternatively, pressing a designated hardware button (210) may cycle through applications, opening the last cycled-to app, for example. In a particular example in a correction institution setting, an inmate may be on a call with his or her attorney, using phone app 212. The inmate may minimize phone app 212, but keep talking with the attorney, while going to a digital inmate handbook, such as by selecting an icon (208) for the digital inmate handbook, and read or discuss something from the handbook with the attorney. In another particular example, a resident may be on a call with a friend or family member, who wants to know if the resident needs money added to his or her commissary account, communications account, or the like. The resident may minimize phone app 212, but keep talking with friend or family member, while launching a commissary and/or communications account app, again, such as by selecting an icon (208) for such an app (or accounts) displayed in interface 204. Whereupon, the resident may discuss the account balance(s) with the friend or family member.

Various embodiments of methods, which may provide multitasking on controlled-environment communication and/or media devices, may call for storing app login information associated with the resident for each app and may thereby enable logging the resident into a resident-selected app, using stored application program login information for the resident-selected application program. To wit, FIG. 4 is a flowchart of example process 400 for providing automated application program login on intelligent controlled-environment communication and media devices (120, 125, 200, etc.), such as via the controlled-environment facility resident interface (204), in accordance with some embodiments of the present systems and methods. In such embodiments, a controlled-environment facility resident interface may run on top of an operating system of the controlled-environment communication and/or media device (120, 125, 200, etc.) and/or as a part of the operating system, at 402, providing a presentation layer on top of an operating system layer on the device. Generally, the interface application stores application program login information associated with the resident for each application program operating under the interface, shown, by way of example, at 404. For example, the login information may be stored on the device and/or on a centralized support system, which may be located at the facility or in a remote location, or a combination of both. At 406, identification information may be accepted from the resident, such as via the interface. Upon verification of the identification information at 408, by the interface application running on the device, apps available for use by a resident of the controlled-environment facility who is operating the controlled-environment communication and/or media device may be presented via the controlled-environment facility resident interface at 410. In various embodiments, a resident is not required to login to the interface or not required to login to the interface before they access certain apps, and/or allowed to toggle between apps. For example, in a correctional environment, an inmate may be allowed to open and toggle between apps such as a Prison Rape Elimination Act (PREA) hotline, phone call app, inmate handbook, and/or the like, without identifying themselves (at 406 and 408). Selection of one of the apps by the resident may result in logging the resident into the selected app at 412 (since the user's identification has been verified at 408). Such logging-in may include logging the resident into the selected app using the stored application program login information, from 404.

As noted, the apps maybe a part of the interface, integrated into the interface, or may run on top of the interface. Apps that may (be adapted to) run under the controlled-environment facility resident interface on the controlled-environment communication and/or media device (120, 125, 200, etc.) may include, by way of example: a controlled-environment facility resident calling application, a video visitation application, a controlled-environment facility resident's manual, a controlled-environment facility resident form submittal program, a controlled-environment facility resident commissary ordering application, a music player, a video player, a web browser (which may be limited to only accessing secure websites and/or third party websites of approved vendors), a document reading program, an email application, a PREA information document, a PREA hotline, a legal research application, a job search application, a controlled-environment facility resident grievance submittal application, sick call app, education app, weather app, video mail, resident information app, games and/or the like. Such applications may be available (for purchase) from a limited source, such as a communications provider, other approved vendor, an (governmental) entity operating the controlled-environment facility, etc. The device (IFD 120, IRD 125, etc.) may be set-up, such as through modifications to the device operating system as discussed above, to only allow access to (certain (types)) of applications through the controlled-environment facility resident interface, such as once such applications are integrated into the interface (e.g. through installing the applications on the device).

Embodiments of the present systems and methods for providing multitasking on intelligent controlled-environment communication and media devices, as described herein, may be implemented or executed, at least in part, by one or more computer systems. One such computer system is illustrated in FIG. 5. In various embodiments, computer system 500 may be a server, a mainframe computer system, a workstation, a network computer, a desktop computer, a laptop, a tablet computing device, media player, or the like. For example, in some cases, one or more of controlled environment facility management system 105, IFD 120, IRD 125, non-resident media device 145, AMS 165 (resident account management system 170), intelligent controlled-environment communication and/or media device 200, and/or the like, may be implemented, in part, or in whole, as a computer system such as computer system 500. Likewise a computer system, such as computer system 500 may implement one or more steps of example processes 300 and/or 400 described above with respect to FIGS. 3 and 4. In various embodiments two or more of these computer systems may be configured to communicate with each other in any suitable way, such as, for example, via a network. For example, in FIG. 1, IFD 120 and/or IRD 125 are illustrated as communicating with non-resident equipment 130 and/or 145, via one or more of networks 135 and 150, through controlled-environment facility communication processing system 105. As a further example, IRD 125 is illustrated as wirelessly communicating with controlled-environment facility communication management system 105 using wireless functionality, such as a wireless data network (i.e. a Wi-Fi network, or the like). In such a controlled-environment facility wireless network, IFD 120 may act as a Wi-Fi (or wired) access point or router, such as for IRD 125, in accordance with some embodiments of the present systems and methods.

As illustrated, example computer system 500 includes one or more processors 510 coupled to a system memory 520 via an input/output (I/O) interface 530. Example computer system 500 further includes a network interface 540 coupled to I/O interface 530, and one or more input/output devices 550, such as video device(s) 560 (e.g., a camera), audio device(s) 570 (e.g., a microphone and/or a speaker), and display(s) 580. Computer system 500 may also include a cursor control device (e.g., a mouse or touchpad), a keyboard, etc. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In various embodiments, computer system 500 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 4, above, may be stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-readable medium may include any tangible or non-transitory storage media or memory media such as magnetic or optical media—e.g., disk or CD/DVD-ROM coupled to computer system 500 via I/O interface 530, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In some embodiments, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any suitable protocol, timing or other data transformations to convert data signals from one component (e.g., system memory 520) into a format usable by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments, some or all of the functionality of I/O interface 530, such as an interface to system memory 520, may be incorporated into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 5, memory 520 may include program instructions 525, configured to implement certain embodiments described herein, and data storage 535, comprising various data accessible by program instructions 525. In an embodiment, program instructions 525 may include software elements corresponding to one or more of the various embodiments illustrated in the above figures. For example, program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident personal communication and/or personal media device comprising:
at least one processor; and
a memory coupled to the at least one processor, the memory configured to store program instructions executable by the at least one processor, the program instructions comprising:
a controlled-environment facility resident personal communication and/or personal media device operating system; and
a controlled-environment facility resident interface program comprising program instructions executable by the at least one processors to cause the controlled-environment facility resident personal communication and/or personal media device to:
run the controlled-environment facility resident interface on top of, or as part of, the operating system;
present application programs available for use by a controlled-environment facility resident on the controlled-environment facility resident personal communication and/or personal media device;
provide, to a controlled-environment facility resident operating the controlled-environment facility resident personal communication and/or personal media device, means for switching between application programs on the controlled-environment facility resident personal communication and/or personal media device;

store application program login information associated with the resident for each application program; and log the resident into a selected application program using the stored application program login information for the selected application program, in response to switching to the selected application program on the controlled-environment facility resident personal communication and/or personal media device.

2. The controlled-environment facility resident personal communication and/or personal media device of claim 1, wherein the controlled-environment facility resident interface program instructions are further executable by the at least one processor to cause the controlled-environment facility resident personal communication and/or personal media device to:

resolve conflicts between the application programs for device resources; and apply resolutions for access to device resources as a result of switching between the application programs by the resident using the means for switching.

3. The controlled-environment facility resident personal communication and/or personal media device of claim 1, wherein the means for switching between application programs comprises a selectable open application program indicator or application program icon displayed on a screen of the controlled-environment facility resident personal communication and/or personal media device representing each application program.

4. The controlled-environment facility resident personal communication and/or personal media device of claim 3, wherein the selectable open application program indicator is a selectable tab displayed on a screen of the controlled-environment facility resident personal communication and/or personal media device representing each open application program.

5. The controlled-environment facility resident personal communication and/or personal media device of claim 1, wherein the means for switching between application programs comprises a function assigned to one or more hardware buttons of the controlled-environment facility resident personal communication and/or personal media device.

6. The controlled-environment facility resident personal communication and/or personal media device of claim 1, wherein the controlled-environment facility resident interface program instructions are further executable by the at least one processors to cause the controlled-environment facility resident personal communication and/or personal media device to automatically log the resident into the selected application program using the stored application program login information for the selected application program, in response to the switching to the selected application program on the controlled-environment facility resident personal communication and/or personal media device.

7. The controlled-environment facility resident personal communication and/or personal media device of claim 1, wherein the controlled-environment facility resident interface program instructions are further executable by the at least one processors to cause the controlled-environment facility resident personal communication and/or personal media device to request and accept identification information from the resident to access the device, and wherein logging the resident into the selected application program further comprises causing the controlled-environment facility resident personal communication and/or personal media device to, in response to switching to the selected application program on the controlled-environment facility resident personal communication and/or personal media device:

verify the identification information; and log the resident into the selected application program using the stored application program login information in response to verifying the identification information.

8. The controlled-environment facility resident personal communication and/or personal media device of claim 1, wherein the application programs comprise at least one of a controlled-environment facility resident calling application, a video visitation application, a controlled-environment facility resident's manual, a controlled-environment facility resident form submittal program, a controlled-environment facility resident commissary ordering application, a music player, a video player, a web browser, a document reading program, an email application, Prison Rape Elimination Act information document, Prison Rape Elimination Act hotline, a legal research application, a job search application, a controlled-environment facility resident grievance submittal application, a sick call application program, education application program, weather application program, video mail, resident information application program, and/or a game.

9. A method for providing a controlled-environment facility resident interface on controlled-environment facility resident personal communication and/or personal media devices, the method comprising:

running the controlled-environment facility resident interface on top of, or as part of, an operating system of the controlled-environment facility resident personal communication and/or personal media device;

presenting application programs available for use by a resident of the controlled-environment facility operating the controlled-environment facility resident personal communication and/or personal media device on the controlled-environment facility resident personal communication and/or personal media device, via the controlled-environment facility resident interface;

storing application program login information associated with the resident for each application program; and logging the resident into a resident-selected application program using the stored application program login information for the resident-selected application program, automatically, in response to selection of the selected application program on the controlled-environment facility resident personal communication and/or personal media device.

10. The method of claim 9, further comprising accepting identification information from the resident to access the device, and wherein logging the resident into the selected application program further comprises:

verifying the identification information; and logging the resident into the selected application program using the stored application program login information in response to verifying the identification information.

11. The method of claim 9, further comprising:

providing means to enable switching between application programs by the resident; and logging the resident into an application program using the stored application program login information for that application program, in response to switching to that application program.

12. The method of claim 11, wherein providing the means to enable switching further comprises:
resolving conflicts between the application programs for device resources; and
applying resolutions for access to controlled-environment facility resident personal communication and/or personal media device resources as a result of the resident switching between application programs.

13. The method of claim 11, wherein providing the means to enable switching between application programs further comprises presenting at least one selectable open application program indicator or application program icon displayed on a screen of the controlled-environment facility resident personal communication and/or personal media device.

14. The method of claim 13, wherein each selectable open application program indicator is a selectable tab displayed on a screen of the controlled-environment facility resident personal communication and/or personal media device representing an open application program.

15. The method of claim 11, wherein providing the means to enable switching between application programs further comprises assigning a function to one or more hardware buttons of the controlled-environment facility resident personal communication and/or personal media device.

16. The method of claim 9, wherein the application programs comprise at least one of a controlled-environment facility resident calling application, a video visitation application, a controlled-environment facility resident's manual, a controlled-environment facility resident form submittal program, a controlled-environment facility resident commissary ordering application, a music player, a video player, a web browser, a document reading program, an email application, a Prison Rape Elimination Act information application document, Prison Rape Elimination Act hotline, a legal research application, a job search application, a controlled-environment facility resident grievance submittal application, a sick call application program, education application program, weather application program, video mail, resident information application program, and/or a game.

17. A non-transitory computer-readable storage medium having controlled-environment facility resident interface program instructions stored thereon that, upon execution by a controlled-environment facility resident personal communication and/or personal media device, cause the controlled-environment facility resident personal communication and/or personal media device to:
run the controlled-environment facility resident interface on top of, or as part of, an operating system of the controlled-environment facility resident personal communication and/or personal media device;
present application programs available for use by a resident of the controlled-environment facility operating the controlled-environment facility resident personal communication and/or personal media device on the controlled-environment facility resident personal communication and/or personal media device, via the controlled-environment facility resident interface;
store application program login information associated with the resident for each application program;
provide means to enable switching between application programs by the resident; and
log the resident into one or more resident-selected application programs using stored application program login information for the resident-selected application program, in response to switching to the selected application program.

18. The non-transitory computer-readable storage medium of claim 17, wherein the controlled-environment facility resident interface program instructions further cause the controlled-environment facility resident personal communication and/or personal media device to:
accept identification information from the resident to access the device, and
wherein logging the resident into the selected application program further comprises causing the controlled-environment facility resident personal communication and/or personal media device to, in response to switching to the selected application program:
verify the identification information; and
log the resident into the selected application program using the stored application program login information in response to verification of the identification information.

19. The non-transitory computer-readable storage medium of claim 17, wherein the controlled-environment facility resident interface program instructions further cause the controlled-environment facility resident personal communication and/or personal media device to:
resolve conflicts between the application programs for controlled-environment facility resident personal communication and/or personal media device resources; and
apply resolutions for access to controlled-environment facility resident personal communication and/or personal media device resources as a result of the resident switching between the application programs.

20. The non-transitory computer-readable storage medium of claim 17, wherein the controlled-environment facility resident interface program instructions further cause the controlled-environment facility resident personal communication and/or personal media device to:
present at least one selectable open application program indicator or application program icon displayed on a screen of the controlled-environment facility resident personal communication and/or personal media device to provide the means to enable switching between the application programs.

21. The non-transitory computer-readable storage medium of claim 20, wherein each selectable open application program indicator is a selectable tab displayed on a screen of the controlled-environment facility resident personal communication and/or personal media device representing each open application program.

22. The non-transitory computer-readable storage medium of claim 17, wherein the controlled-environment facility resident interface program instructions further cause the controlled-environment facility resident personal communication and/or personal media device to:
assign a function to one or more hardware buttons of the controlled-environment facility resident personal communication and/or personal media device to provide the means to enable switching between the application programs.

23. The non-transitory computer-readable storage medium of claim 17, wherein the application programs comprise at least one of a controlled-environment facility resident calling application, a video visitation application, a controlled-environment facility resident's manual, a controlled-environment facility resident form submittal program, a controlled-environment facility resident commissary ordering application, a music player, a video player, a web browser, a document reading program, an email application, a Prison Rape Elimination Act information document, Prison Rape Elimination Act hotline, a legal research application, a job search application, a controlled-environment facility resident grievance submittal application, a sick call application program, education application program, weather application program, video mail, resident information application program, and/or a game.

* * * * *